May 29, 1962 D. J. DWINELL ETAL 3,036,405
CANE CUTTING APPARATUS
Filed May 29, 1958 6 Sheets-Sheet 1

INVENTORS
DWIGHT J. DWINELL
JOHN J. CHADDERTON
BY
ATTORNEY

May 29, 1962  D. J. DWINELL ETAL  3,036,405
CANE CUTTING APPARATUS
Filed May 29, 1958  6 Sheets-Sheet 4

INVENTORS
DWIGHT J. DWINELL
JOHN J. CHADDERTON
BY Joseph C. Ryan
ATTORNEY

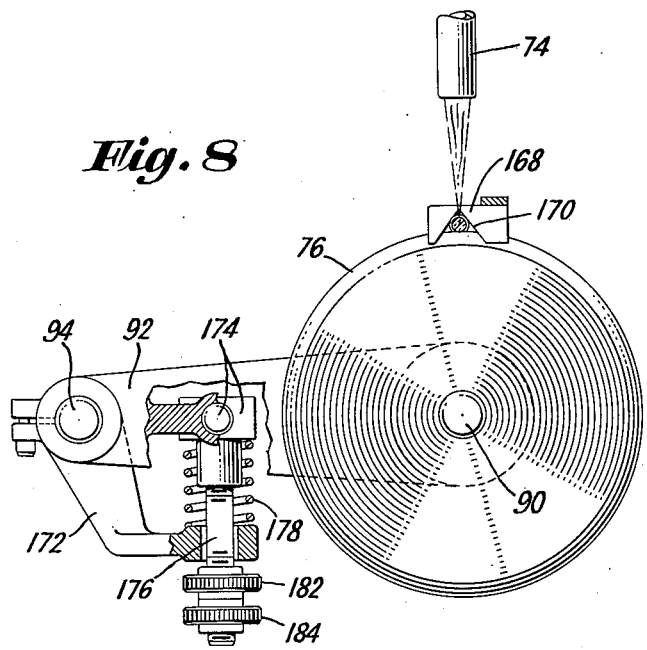
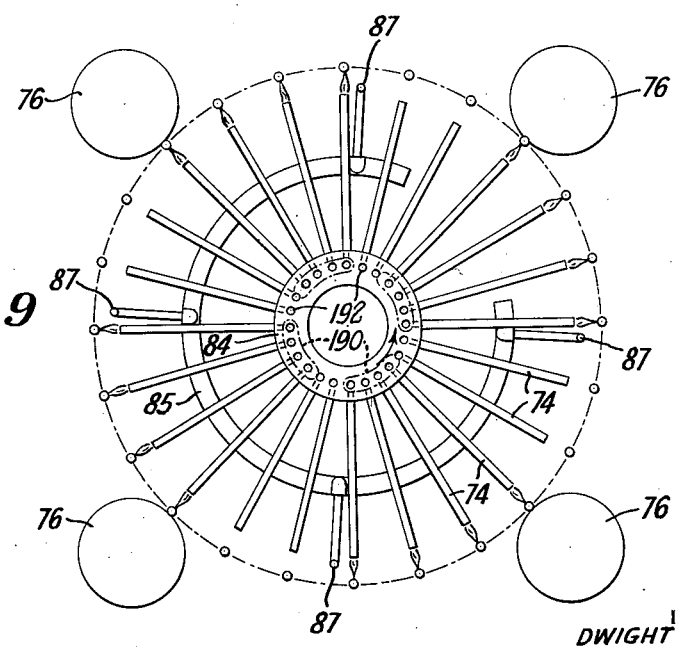

May 29, 1962  D. J. DWINELL ETAL  3,036,405
CANE CUTTING APPARATUS
Filed May 29, 1958  6 Sheets-Sheet 6
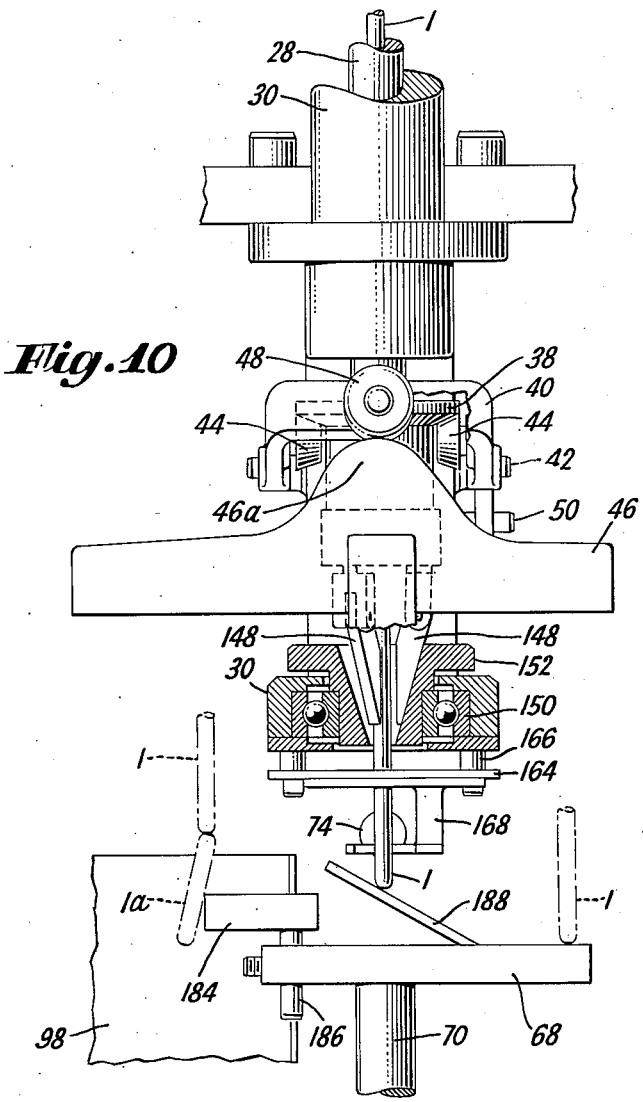
Fig.10
Fig.11
INVENTORS
DWIGHT J. DWINELL
JOHN J. CHADDERTON
BY
ATTORNEY

United States Patent Office 3,036,405
Patented May 29, 1962

3,036,405
CANE CUTTING APPARATUS
Dwight J. Dwinell, Reading, and John J. Chadderton, Lynn, Mass., assignors, by mesne assignments, to Sylvania Electric Products Inc., Wilmington, Del., a corporation of Delaware
Filed May 29, 1958, Ser. No. 738,833
3 Claims. (Cl. 49—48)

This invention relates to glass working apparatus and more particularly to a cane cutting machine.

In the manufacture of electrical and electronic devices, there are a multitude of applications and uses for relatively small pieces of glass rod, generally called "cane" in the art. For example, in the manufacture of incandescent lamps, pieces of cane are used as an insulating supporting member for portions of the filament mount structure. Since high speed equipment is usually used in the mass production manufacture of these lamps, it is apparent that great quantities of these pieces of cane are required. Since there are many different types, sizes and shapes of these lamps, it is also apparent that these pieces of cane are required in various lengths and diameters.

In view of the foregoing, an object of this invention is to provide a high speed, automatic cane cutting machine.

Another object is to provide a cane cutting machine capable of operating on cane of various diameters.

A further object is to provide a cane cutting machine capable of cutting cane into various lengths.

A further object is to provide a cane cutting machine capable of cutting cane into a plurality of lengths, for example four, during one revolution of the machine turret.

A further object is to provide a cane cutting machine capable of cutting cane accurately to a given length at a high rate of speed while maintaining a uniform radius and glazing on both ends of each cut piece.

A feature of this apparatus is the provision of means for effecting the fabrication of four pieces of cane per revolution of the turret.

These and other objects, advantages and features are attained, in accordance with the principles of our invention, by providing a continuously rotating turret with a plurality of continuously revolving cane-carrying heads. A burner, attached to the underside of the turret, is disposed in line radially with each head for heating the cane depending therefrom. The cane is heated during its travel until it moves into engagement with a freely rotatable cutter wheel which effects a scoring thereof. Subsequent to scoring, the scored piece is cracked off and collected in a suitable receptacle, The remainder of the cane is then automatically re-gauged and the cycle is repeated. The cane cutting machine is designed to permit this cycle of operation to be effected during one quarter of a revolution of the turret. This makes possible the use of four sets of devices and mechanisms to enable the manufacture of four pieces of cane per head during one revolution of the turret.

In the specific embodiment of our invention illustrated in the accompanying drawings and described in detail below, FIGURE 1 is a plan view of a cane cutting machine, cut away at different elevations to provide maximum illustration of the mechanisms, except for the drive.

FIGURE 8 is a plan view, partly in section, of the cutting wheel assembly.

FIGURE 9 is a diagrammatic plan view of the machine showing the relative location of the four cutting wheels, the cane-carrying heads, the burners, and the valve which feeds the burners, the elongated slots in the lower valve plate being shown in phantom to aid in illustrating the on-off cycles of the burners.

FIGURE 10 is a front elevational view of the cane-carrying head in its elevated position, as shown also in FIGURE 6. The cracking off and re-gauging of the cane is also illustrated in this figure.

FIGURE 11 is an enlarged detail, partly in section, of a piece of cane produced by the cane-cutting machine.

Figure 1:
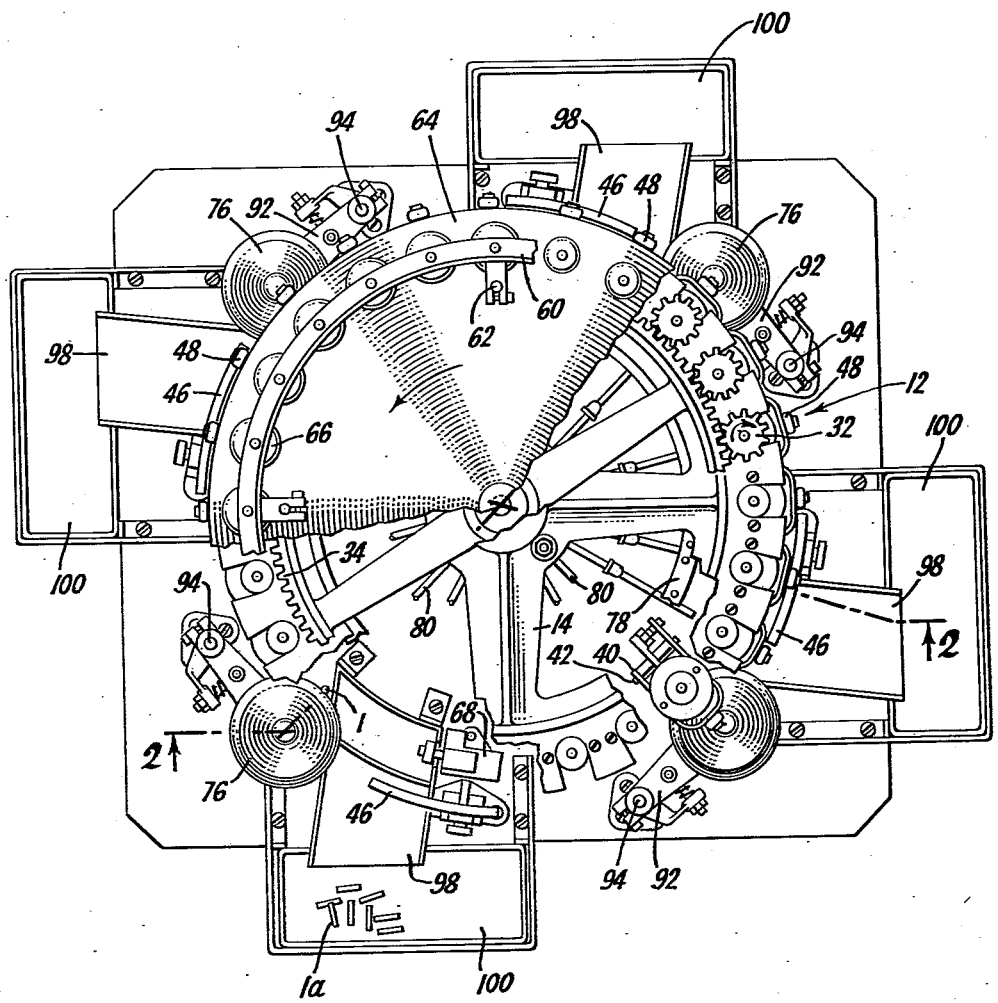
Figure 2:
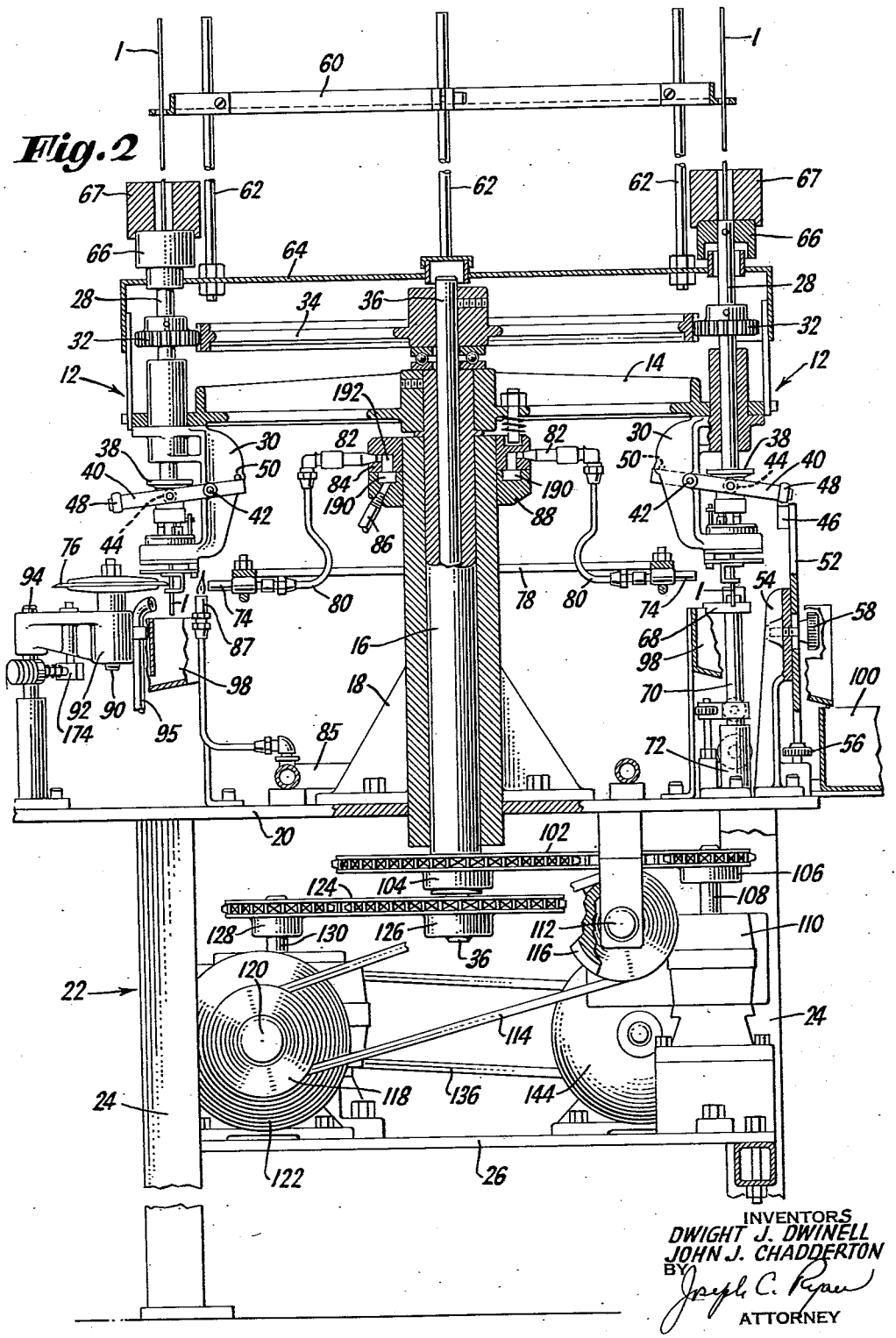
FIGURE 2 is an elevational view, partly in section, taken along the line 2—2 of FIGURE 1.

Referring now to FIGURES 1 and 2, the cane cutting apparatus illustrated therein comprises a plurality of heads 12 disposed about the periphery of a turret 14. The turret 14 is rotated (in a counter-clockwise direction as indicated in FIG. 1) by a turret shaft 16 to move the work-carrying heads 12 through a path along which certain devices and mechanisms are disposed for performing certain operations on the work. The turret shaft 16 is supported by a pedestal 18 on base plate 20 which is a part of a table 22 which includes legs 24 and shelf 26.

Each head 12 (FIG. 2) comprises a spindle 28 rotatably supported by a spindle support 30 which is fixedly mounted on turret 14, and a pinion gear 32 pinned to spindle 28. The pinion gear 32 of each head 12 meshes with gear 34 on gear drive shaft 36 which extends through and is rotatable within the turret shaft 16. Thus, as is indicated by the arrows in FIG. 1, as the turret 14 advances the heads 12 in a counter-clockwise direction, the gear 34 and the several pinion gears 32 effect clockwise rotation of the heads 12 about their respective spindles 28.

Each head 12 (FIG. 2) also includes a jaw holder 38 pinned to spindle 28 and a lifting yoke 40 pivotally mounted at 42 on spindle support 30. The lifting yoke 40 is provided with a pair of tapered rolls 44 which engage and ride on the undercut portion of the jaw holder 38. Actuation of the lifting yoke 40 to raise the jaw holder 38 is effected by a bar cam 46 disposed in the path traversed by roller 48 on lifting yoke 40 as shown on the right side of FIG. 2. In its rest position, the lifting yoke 40 is maintained in the position shown on the left side of FIG. 2 by a stop pin 50 on spindle support 30. The bar cam 46 is attached to an arm 52 which is supported by bracket 54 mounted on base plate 20. The elevation of bar cam 46 may be adjusted by manipulation of jack screw 56 to raise or lower the arm 52 on which the bar cam is mounted. Once the adjustment has been made, the thumb screw 58 may be tightened to hold the arm 52 securely in the desired position.

The work, a long glass rod, generally known in the art as cane 1, is fed to each of the heads 12 through apertures provided therefor in a cane supporting ring 60 (FIG. 2) which is supported on rods 62 upstanding on cover 64 which is in turn mounted on turret 14. The cover 64, and a shield 66 which is attached to the upper end of each spindle 28, protect the top of the working parts of the apparatus from dust, dirt, and other foreign matter which would tend to interfere with satisfactory operation of the moving parts. A weight 67, having an aperture extending therethrough in alignment with spindle 28, rests on top of shield 66. As will be appreciated more fully from the description below of the cane-gripping jaws and their associated parts, the downward force exerted by the weight 67 on the spindle 28 insures a firm, positive gripping of the cane by the jaws. This, in turn, insures good clean cuts of the cane and prevents short scrap ends of cane from being accidentally discharged from the head.

In feeding the work to the apparatus (FIG. 2), the cane 1 is threaded up through the cane supporting ring 60 and down through spindle 28, and finally coming to rest on gauge block 68. Gauge block 68 is mounted on gauge rod 70 which is adjustably supported in gauge rod pedestal 72 on base plate 20. Micrometer adjustment of the elevation of gauge rod 70 in its pedestal 72 effects adjustment of the elevation of gauge block 68 and thus makes possible the cutting of pieces of cane of various accurate lengths.

A bank of burners 74 provides the heat for heating the cane 1 before it is scored by a cutting wheel 76. The burners 74 (FIG. 2) are clamped to a burner supporting ring 78 to insure their proper positioning relative to the work. The burners 74 are connected through tubing 80 and nipples 82 to a movable valve plate 84. A gaseous combustible mixture is fed through nipples 86 to the stationary valve plate 88. Since the burners 74 are not on during the entire 360 degrees revolution of the turret, means are provided for igniting the burners at the desired time. Pilot burner manifold 85 on base plate 20 is provided with four pilot burners 87 to fire burners 74. After the cane 1 has been heated sufficiently by burners 74, it moves in its travel into engagement with the periphery of cutting wheel 76 which effects a scoring thereof as the cane moves past the wheel. The cutting wheel 76 is mounted on a cutter shaft 90 which is freely rotatable in one end of cutter arm 92. The cutter arm 92 is attached at its other end to a pivot post 94 supported by pedestal 96 on base plate 20. A tube 95, a fragmentary portion of which is shown in FIGURE 2, is attached to cutter arm 92 and is connected to a source (not shown) of compressed air. The mouth of this tube 95 is positioned so that a blast of air emanating therefrom strikes the cane immediately after it has been scored. After the cane 1 has been scored and chilled it is cracked off and then the piece 1a of pre-determined length drops onto chute 98 and into bin 100.

Figure 3:
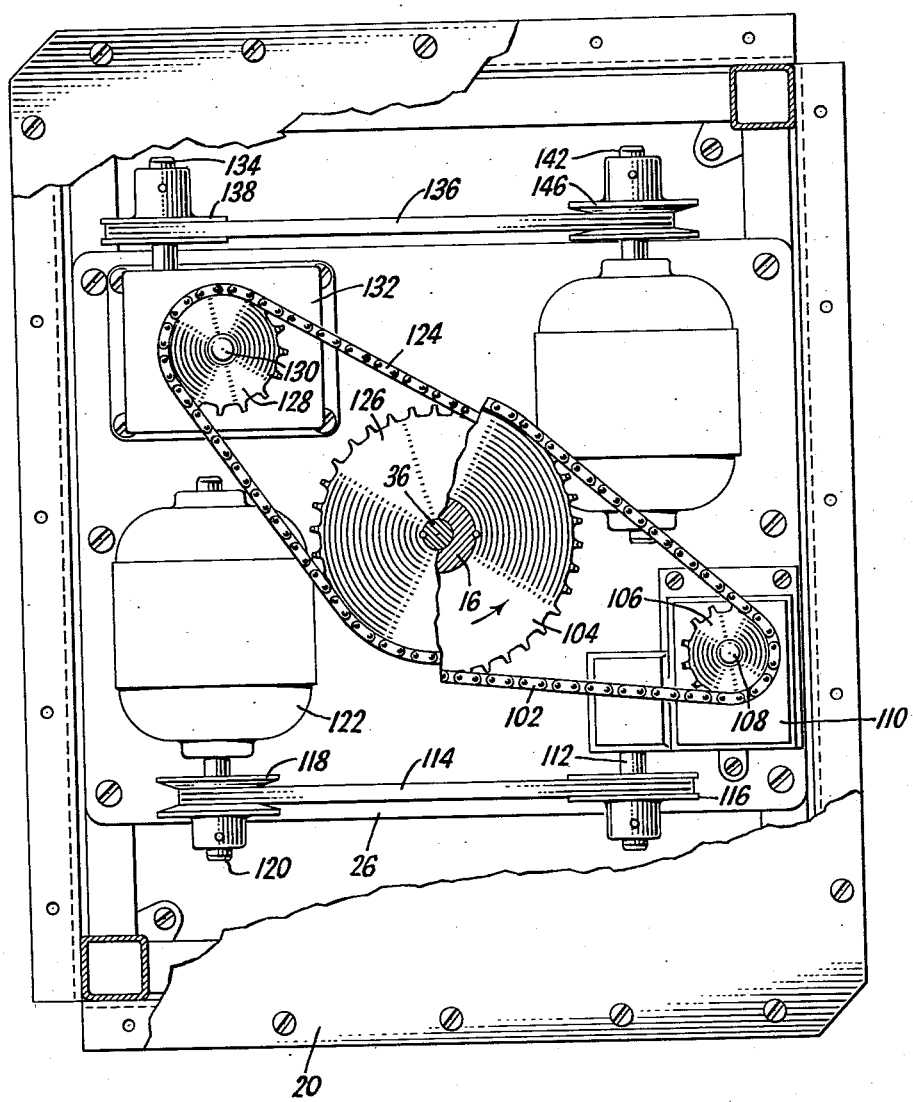
FIGURE 3 is a plan view of the drive which is disposed beneath the table on which the cane cutting apparatus is mounted.
Figure 4:
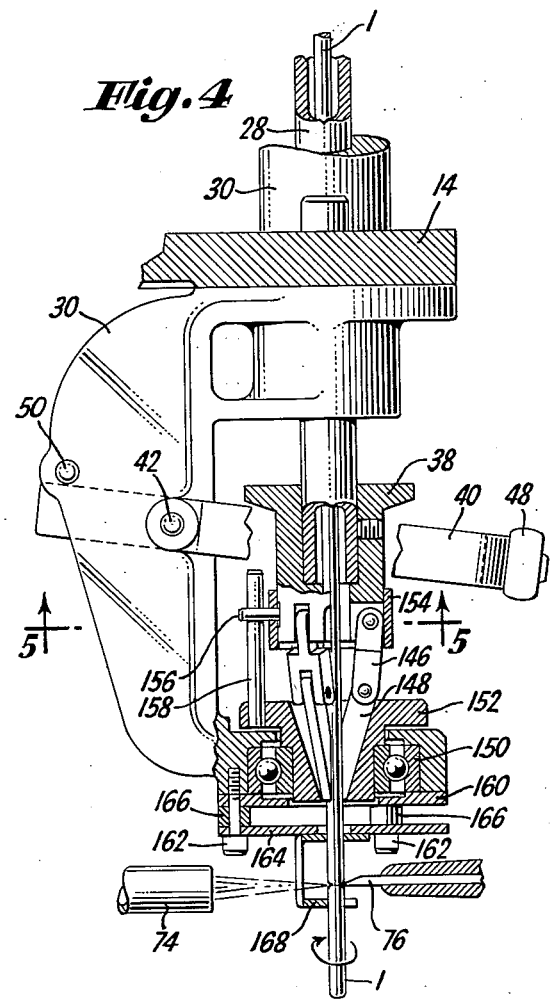
FIGURE 4 is an enlarged detail, in elevation and partly in section, of the cane-carrying head, showing the relative disposition of the several components thereof at the time of scoring.

The means for driving the turret 14 in a counterclockwise direction and the means for rotating the spindles 28 of the heads 12 in a clockwise direction will now be described, reference being made particularly to FIGURES 2 and 3.

Turret shaft 16 is driven by chain 102 which connects turret drive sprocket 104 on turret shaft 16 to turret pinion sprocket 106 on output shaft 108 of speed reduction unit 110. Input shaft 112 of speed reduction unit 110 is driven by belt 114 which connects pulley 116 on input shaft 112 to pulley 118 on output shaft 120 of motor 122.

Gear drive shaft 36 is driven by chain 124 which connects head drive sprocket 126 on gear drive shaft 36 to head pinion sprocket 128 on output shaft 130 of speed reduction unit 132. Input shaft 134 of speed reduction unit 132 is driven by belt 136 which connects pulley 138 on input shaft 134 to pulley 140 on output shaft 142 of motor 144. The shelf 26 of table 22 provides a mounting base for the drive mechanisms just described.

Figure 6:
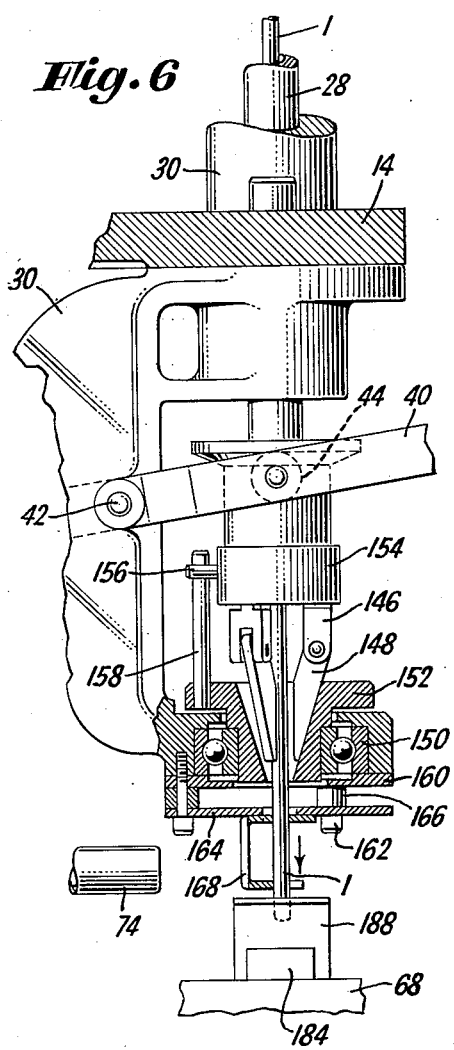
FIGURE 6 is, like FIGURE 4, an enlarged detail, in elevation and partly in section, of the cane-carrying head. In this figure, the cane is shown in the process of dropping down to be re-gauged after one piece thereof has been cracked off and before heating is initiated.
Figure 5:
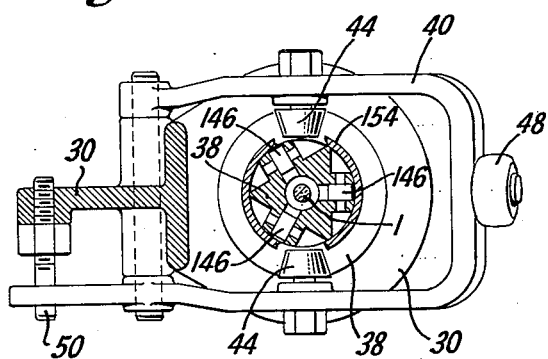
FIGURE 5 is a transverse sectional view of the cane-carrying head, taken along the line 5—5 of FIGURE 4, showing particularly the jaw links, which have not been shown in section for clarity of illustration.
Figure 7:
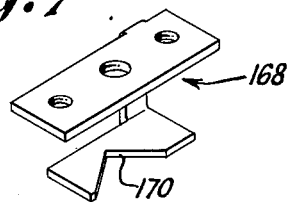
FIGURE 7 is a perspective detail of the cane support which is disposed at the lower extremity of the cane-carrying head.

Reference is now made to FIGURES 4–7 in which one of the heads 12 is illustrated in detail. As was described above, in connection with the description of FIGURES 1 and 2, each head 12 comprises a spindle 28, a spindle support 30, a jaw holder 38 pinned to spindle 28, a lifting yoke 40 pivotally mounted at 42 on spindle support 30, and a pair of tapered rolls 44 on lifting yoke 40 and riding on the undercut portion of jaw holder 38. Three jaw links 146 are pivotally mounted in and depend from the jaw holder 38 and a tapered jaw 148 is pivotally mounted in and depends from each of the jaw links 146. The lower extremity of the spindle support 30 is provided with a bearing 150, the outer race of which is secured thereto. The inner race of bearing 150 has secured thereto a jaw guide 152 which has a funnel-shaped opening formed therein, through which cane 1 extends, the wall of the funnel-shaped opening defining a guide surface for the tapered jaws 148. A thin sleeve 154 encircles and is attached to the lower end of jaw holder 38. A dowel 156, projecting laterally from the jaw holder 38 and the sleeve 154, engages transversely a dowel 158 upstanding on jaw guide 152, thus providing a driving means for effecting rotation of jaw guide 152 with jaw holder 38 and spindle 28. A bearing cover 160 is attached to spindle support 30 by screws 162. The screws 162 also serve as the means for supporting heat shield 164 below and spaced from the bearing cover 160 by spacers 166. A cane support 168, a detail of which is shown in FIGURE 7, is attached to and depends from the heat shield 164. Cane 1 projects through registered apertures therefor in the heat shield and the cane support 168 and seats in the notch 170 (FIG. 7) in the cane support 168.

As was mentioned above in the description of FIGURES 1 and 2, after the cane 1 has been heated sufficiently by the burners 74 it is moved past a freely rotatable cutting wheel 76 which scores it. As described above, this cutting wheel 76 is mounted on the cutter shaft 90 which is freely rotatable in one end of cutter arm 92 and the cutter arm is attached at its other end to pivot post 94 supported by pedestal 96 on base plate 20. A detail of the cutter wheel assembly is shown in FIGURE 8. An adjusting arm 172 is fixedly mounted on pivot post 94. A swivel 174, supported in and depending from cutter arm 92 (see also FIG. 2), has one end of a stud 176 pinned thereto. The stud 176, spring loaded by spring 178, is provided with an adjusting nut 182 and a lock nut 180. This arrangement provides a means for regulating the force exerted by the cutter wheel 76 on the cane 1 during scoring thereof and also effects automatic compensation when a relatively cool piece of cane is being cut. As shown in FIGURE 8, the cane 1, constrained by the notch 170 in cane support 168 and the cutter wheel 76, is relatively cool and has caused a slight clockwise deflection of the cutter arm 92 as indicated by the spacing between lock nut 182 and the adjacent face of adjusting arm 172. The edge of the cutting wheel is on a level between the aperture and notch of the cane support, whereby a firm backing for the cane is afforded when the cane is scored, as shown in FIG. 8. Under normal conditions these two members would be flush with one another.

The apparatus for cracking off a piece 1a from cane 1 and re-gauging cane 1 for another operating cycle is illustrated particularly in FIGURE 10. After the cane 1 has been scored by the cutting wheel 76 as described above, it is carried by the head 12 into engagement with striker 184 which lies in its path. The striker 184 is mounted on striker post 186 attached to the leading end of gauge plate 68. The striker 184 cracks off piece 1a from cane 1, the piece 1a falling into chute 98 and then into bin 100 (FIG. 1). As will be noted from an examination of FIGURE 10, at this point in the operation of the apparatus, roller 48 on yoke 40 has moved into engagement with and is riding along bar cam 46. As soon as the piece 1a has been cracked off from cane 1, the roller 48 rides up on the rise 46a of cam 46. This actuates the lifting yoke 40 which, through its tapered rolls 44, raises the jaw holder 38 (FIGS. 6 and 10). Elevation of the jaw holder 38 raises the tapered jaws 148 out of gripping engagement with the cane 1, thus permitting the cane 1 to drop, as indicated by the arrow in FIGURE 6. With the turret 14 moving in a counter-clockwise direction, and the cane 1 free to drop, the cane slides downwardly along an inclined gauge plate 188 and onto gauge block 68. It will be noted from an examination of FIGURE 10 that when the cane 1 has completed its travel down the plate 188, the roller 48 on yoke 40 has moved off of the rise 46a of cam 46 and along the flat portion thereof. This downward travel of roller 48 off of the rise 46a of cam 46 permits the jaw holder 38 to drop and thus causes the tapered jaws 148 to drop down into gripping engagement with the cane 1. Thus, when the turret 14 has advanced to a point where the roller 48 rides off of cam 46, and the free end of cane 1 has moved off of gauge plate 68, the re-gauged cane has been re-gripped by the jaws 148 and is ready for another heating, scoring and cracking off cycle.

As indicated above, one of the features of this invention is the production of four pieces of cane 1a per head 12 during one revolution of the turret 14. As may be noted from an examination of FIGURE 1, there are four cutting wheels 76 for scoring the cane, four bar cams 46 for actuating the lifting yokes 40 associated with the heads 12, four bins 100 for receiving the pieces of cane 1a, etc. FIGURE 9 shows, diagrammatically, the burner-valve arrangement for effecting this production. At about the time the cane 1 moves into engagement with the cutting wheel 76 and scoring thereof is effected, the burner 74 goes off. The burner 74 stays off until the cane 1 has been re-gauged as described above in the description of FIGURE 10. The burners then come on and heat the cane 1 until it is about to be scored by the next cutting wheel 76. The elongated slots 190 in the stationary valve plate 88 (FIG. 2) and the ports 192 in the movable valve plate 84 are arranged substantially as shown in FIGURE 9 to accomplish this result.

The operation of the apparatus will now be described. Each of the several heads 12 is provided with a length of cane 1 by an operator who threads the cane up through the cane-supporting ring 60 (FIG. 2) and down into the spindle 28. The cane 1 drops freely through the spindle 28 and the jaws 148 (FIGS. 6 and 10) until it strikes the gauge plate 188. With the turret 14 (FIG. 1), on which the several heads 12 are mounted, turning in a counter-clockwise direction, the lower end of cane 1 (FIG. 10) slides down gauge plate 188, onto and along gauge block 68. Before the cane 1 moves out of engagement with gauge block 68, the roller 48 on yoke 40 rides down along the low side of cam 46, thus permitting the jaws 148 to drop into gripping engagement with the cane 1.

With the cane 1 now gauged by gauge block 68 and held in the spindle 28 by the jaws 148, and with the head 12 being rotated clockwise by pinion gear 32 and gear 34 as the turret 14 moves the heads 12 in a counter-clockwise direction, the depending portion of cane 1 is heated by burners 74 (FIGS. 2 and 9) until the cane is advanced into engagement with cutting wheel 76 which effects a scoring thereof. A blast of air from tube 95 chills the cane and sets up strains therein. The cooled cane then advances into engagement with striker 184 (FIG. 10) which cracks off piece 1a which then falls along chute 98 and into bin 100 (FIG. 1). At this point, roller 48 on lifting yoke 40 has moved into engagement with bar cam 46 (FIG. 10). As the roller 48 rides upwardly on rise 46a of cam 46, the jaw holder 38 and the jaws 148 depending therefrom are elevated, the jaws 148 moving out of gripping engagement with the cane 1. This permits the cane 1 to drop, sliding along gauge plate 188 and onto gauge block 68, thus completing one operating cycle and effecting a re-gauging of the cane 1 for the next repetitive cycle.

In the description above, it was pointed out that the elevations of bar cam 46 and gauge block 68 are adjustable. The provision of means for adjusting the elevation of bar cam 46 makes possible the utilization of the apparatus of our invention on cane of various diameters, because the length of travel of the jaws 148 into and out of engagement with the cane 1 depends on the relative elevation of bar cam 46. The provision of means for adjusting the elevation of gauge block 68 makes possible the utilization of the apparatus of our invention to manufacture pieces 1a of cane of different lengths because the length of the pieces 1a depend on how far down the cane 1 drops before it rides along gauge plate 188 and gauge block 68.

What we claim is:

1. Cane cutting apparatus comprising:
   a table;
   a turret rotatably supported on said table;
   a plurality of cane-carrying heads disposed about the periphery of said turret with the cane depending therefrom,
   each of said heads including a chuck for gripping the cane intermediate the ends thereof;
   means for rotating said turret to advance the said heads thereon through a pre-determined path;
   means for revolving each of said heads while said turret is rotating whereby the cane carried by each of said heads is revolved as it is carried through said pre-determined path;
   a plurality of burners disposed in heating relationship with respect to a portion of said cane depending from said cane-carrying heads;
   means, disposed in the path traversed by said cane depending from each of said heads, for scoring said cane;
   means, disposed adjacent to the path traversed by said cane depending from each of said heads, for chilling the scored portion of said cane immediately after scoring has been effected;
   and means, disposed in the path traversed by said cane depending from each of said heads and beyond the scoring means,
   for subsequently breaking off said scored and chilled piece of cane,
   said chilling means being mounted on the machine and interposed between the scoring means and breaking means.

2. A head for cane cutting apparatus comprising:
   a spindle through which a length of cane extends;
   a jaw holder attached to an end of said spindle;
   a plurality of jaws attached to and depending from said jaw holder and through which said cane extends;
   an inverted, hollow, frusto-conical jaw guide disposed in encompassing relationship with respect to the tips of said jaws, the cane extending through the truncated portion of said jaw guide;
   a cane support disposed beneath and in register with said jaw guide,
   said cane support having an aperture and a notch formed therein and in register with one another, said cane extending through said aperture and through and in contact with said notch;

a scoring disc with its edge on a level between the levels of the aperture and notch of the cane support; and means for lowering and raising said jaw holder to move the said jaws into and out of gripping engagement with respect to the cane extending therebetween.

3. The subject matter of claim 2 in which there is provided
a weighted member attached to the upper end of said spindle for providing a downward force urging said jaws into a firm positive gripping engagement with the cane extending therebetween.

References Cited in the file of this patent

UNITED STATES PATENTS

| | | |
|---|---|---|
| 1,546,352 | Rippl | July 14, 1925 |
| 1,546,353 | Rippl et al. | July 14, 1925 |
| 1,962,985 | Dichter | June 12, 1934 |
| 2,297,149 | Houck et al. | Sept. 29, 1942 |
| 2,582,818 | Coby | Jan. 15, 1952 |
| 2,641,870 | Eisler | June 16, 1953 |
| 2,829,900 | Davis | Apr. 8, 1958 |